US009748683B2

(12) United States Patent
Tsuru

(10) Patent No.: US 9,748,683 B2
(45) Date of Patent: Aug. 29, 2017

(54) ELECTROCONDUCTIVE MATERIAL SUPERIOR IN RESISTANCE TO FRETTING CORROSION FOR CONNECTION COMPONENT

(71) Applicant: Kobe Steel, Ltd., Kobe-shi (JP)

(72) Inventor: Masahiro Tsuru, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 376 days.

(21) Appl. No.: 14/210,749

(22) Filed: Mar. 14, 2014

(65) Prior Publication Data

US 2014/0295070 A1 Oct. 2, 2014

(30) Foreign Application Priority Data

Mar. 29, 2013 (JP) ................................. 2013-071988

(51) Int. Cl.

| | |
|---|---|
| ***B32B 15/01*** | (2006.01) |
| ***C23C 28/02*** | (2006.01) |
| ***C25D 5/10*** | (2006.01) |
| ***H01R 13/03*** | (2006.01) |
| ***C25D 5/12*** | (2006.01) |

(Continued)

(52) U.S. Cl.

CPC ........... *H01R 13/03* (2013.01); *C23C 28/021* (2013.01); *C23C 30/00* (2013.01); *C25D 5/10* (2013.01); *C25D 5/12* (2013.01); *C25D 5/50* (2013.01); *C25D 7/0614* (2013.01); *C25D 5/34* (2013.01); *Y10T 428/12715* (2015.01)

(58) Field of Classification Search

USPC ......................... 428/647, 648, 668, 669, 671

See application file for complete search history.

(56) References Cited

U.S. PATENT DOCUMENTS

| | | | |
|---|---|---|---|
| 7,820,303 | B2 | 10/2010 | Suzuki et al. |
| 7,871,710 | B2 | 1/2011 | Masago et al. |

(Continued)

FOREIGN PATENT DOCUMENTS

| | | | |
|---|---|---|---|
| CN | 100583309 | C | 1/2010 |
| EP | 1 788 585 | A1 | 5/2007 |

(Continued)

OTHER PUBLICATIONS

Extended European Search Report issued on Jun. 23, 2014 in the corresponding European Application No. 14001055.4.

*Primary Examiner* — Humera Sheikh
*Assistant Examiner* — Lucas Wang
(74) *Attorney, Agent, or Firm* — Oblon, McClelland, Maier & Neustadt, L.L.P.

(57) ABSTRACT

An electroconductive material includes a Cu or Cu alloy base member, a Cu—Sn alloy coating layer, and a Sn coating layer. The Cu—Sn alloy coating layer has a Cu content of 20 to 70 atomic %, and an average thickness of 0.2 to 3.0 μm. The Sn coating layer has an average thickness of 0.2 to 5.0 μm. A surface of the electroconductive material has an arithmetic average roughness Ra of at least 0.15 μm in at least one direction along the surface and 3.0 μm or less in all directions along the surface. The Cu—Sn alloy coating layer is partially exposed at the surface of the electroconductive material. An area ratio of the Cu—Sn alloy coating layer exposed at the surface of the electroconductive material is 3 to 75%. An average crystal grain size on a surface of the Cu—Sn alloy coating layer is less than 2 μm.

22 Claims, 1 Drawing Sheet

(51) Int. Cl.

| | |
|---|---|
| ***C25D 5/50*** | (2006.01) |
| ***C25D 7/06*** | (2006.01) |
| ***C23C 30/00*** | (2006.01) |
| *C25D 5/34* | (2006.01) |

(56) References Cited

U.S. PATENT DOCUMENTS

| | | | | |
|---|---|---|---|---|
| 8,445,057 | B2 | 5/2013 | Suzuki et al. | |
| 2008/0090096 | A1 | 4/2008 | Suzuki et al. | |
| 2009/0053553 | A1 * | 2/2009 | Masago | B32B 15/01 428/647 |
| 2009/0116996 | A1 | 5/2009 | Aruga et al. | |
| 2010/0266863 | A1 * | 10/2010 | Tanaka | C23C 18/165 428/555 |
| 2010/0304016 | A1 | 12/2010 | Suzuki et al. | |
| 2010/0304177 | A1 | 12/2010 | Yoshida et al. | |
| 2011/0236712 | A1 * | 9/2011 | Masago | C23C 28/021 428/600 |
| 2011/0266035 | A1 | 11/2011 | Sakurai et al. | |
| 2013/0237105 | A1 | 9/2013 | Tsuru et al. | |
| 2013/0260174 | A1 | 10/2013 | Tsuru | |
| 2014/0065440 | A1 | 3/2014 | Tsuru | |
| 2014/0134457 | A1 | 5/2014 | Sakurai et al. | |

FOREIGN PATENT DOCUMENTS

| | | | | |
|---|---|---|---|---|
| EP | 2 351 875 A1 | | 8/2011 | |
| JP | 2006-183068 A | | 7/2006 | |
| JP | 2009-007668 | | 1/2009 | |
| JP | 2009-097040 | * | 5/2009 | C25D 5/10 |
| JP | 2009-97040 A | | 5/2009 | |
| JP | 2011-042860 | | 3/2011 | |

* cited by examiner

ELECTROCONDUCTIVE MATERIAL SUPERIOR IN RESISTANCE TO FRETTING CORROSION FOR CONNECTION COMPONENT

CROSS-REFERENCE TO RELATED APPLICATIONS

This application claims priority to Japanese Patent Application No. 2013-71988, filed Mar. 29, 2013, the disclosure of which is incorporated herein by reference in its entirety.

BACKGROUND OF THE INVENTION

Field of the Invention

The present invention relates to an electroconductive material for a connection component, such as a terminal, mainly used in the field of automotive wiring harnesses and general consumer products, and particularly to an Sn-plated electroconductive material for a connector capable of realizing decreased fretting corrosion.

Description of the Related Art

A mating connector consisting of a male connector and a female connector is used for connecting electrical cables in an automobile (automotive wiring harness) or the like. A male terminal and a female terminal, generally stamped out from a tin plated copper alloy sheet or strip, are embedded in a male connector and a female connector, respectively.

In the field of automobile electric equipment, use of multi-terminalization of connectors has progressed due to the advancement and wide use of electronic control. The force required for inserting connectors has increased such that the physical load on workers has increased. Thus, it is desired to decrease the connector inserting force. It is effective to decrease the contacting pressure of the terminals to decrease the inserting force of a connector.

Lowering the contacting pressure in Sn-plated small terminals or the like, however, presents the problem of fretting corrosion. Fretting corrosion, the abrasion of Sn on the male and the female terminals, is caused by repeated sliding between the male and the female terminals due to vibration of an engine of the automobile and vibration while the automobile is moving. The abraded Sn powder is then oxidized. The oxidized Sn powders subsequently deposit around the contact point in large volume and invade the contact point, which increases contact resistance at the contact point.

JP-A-2006-183068, which corresponds to US 2008/0090096, the disclosure of which is incorporated herein by reference in its entirety, discloses an electroconductive material for a connection component obtained by plating Ni, Cu, and Sn in order on a roughened surface of a copper alloy base member followed by reflow treatment. The electroconductive material for a connection component includes a surface coating layer including a Ni coating layer, a Cu—Sn alloy layer, and a Sn coating layer formed on a surface of the copper alloy base member, wherein the Cu—Sn alloy hard coating layer is formed to be partially exposed at the outside surface of the Sn coating layer so as to decrease the connector inserting force without decreasing the contacting pressure of the terminals.

SUMMARY OF THE INVENTION

It is not necessary to decrease the contact pressure of the terminals to lower the insertion force in the electroconductive material in US 2008/0090096. As such, the generation of Sn powders is much less in the electroconductive material, and occurrence of fretting corrosion and increase of contact resistance are suppressed as compared with conventional copper alloy materials with Sn plating. The electroconductive material for a connection component is, in fact, increasingly used in the field of electric equipment for automobiles such as an automotive wiring harness or the like. However, it remains necessary to further improve the resistance to fretting corrosion. In embodiments of the present invention, resistance to fretting corrosion of the electroconductive material for a connection component disclosed in US 2008/0090096 is improved.

Embodiments of the present invention include an electroconductive material for a connection component, including a base member made of a copper alloy sheet or strip, a Cu—Sn alloy coating layer formed on the base member and having a Cu content of 20 to 70 atomic % and an average thickness of 0.2 to 3.0 μm, and a Sn coating layer formed on the Cu—Sn alloy coating layer having an average thickness of 0.2 to 5.0 μm. A surface of the material may be subjected to reflow treatment and may have an arithmetic average roughness Ra of 0.15 μm or more in at least one direction along the surface and an arithmetic average roughness Ra of 3.0 μm or less in all directions along the surface. The Cu—Sn alloy coating layer may be formed to so as to be partially exposed at the outside surface of the Sn coating layer, the area ratio of the exposed surface of the Cu—Sn alloy coating layer to the material surface being 3 to 75% (these are features of the electroconductive material for a connection component disclosed in US 2008/0090096), and the Cu—Sn alloy coating layer may have an average crystal grain size of less than 2 μm.

Embodiments of the electroconductive material for a connection component according to the present invention may include preferred embodiments described hereinafter like those disclosed in US 2008/0090096.

In embodiments, the average interval of the regions of Cu—Sn alloy coating layer exposed at the outside surface of the Sn coating layer is 0.01 to 0.5 mm in at least one direction along the surface.

In embodiments, the thickness of the regions of the Cu—Sn alloy coating layer exposed at the outside surface of the Sn coating layer is 0.2 μm or more.

In embodiments, the surface of the base member has an arithmetic average roughness Ra of 0.3 μm or more in one or more direction(s) along the surface, and an arithmetic average roughness Ra of 4.0 μm or less in all directions along the surface.

In embodiments, in the base member surface, asperities have an average interval Sm of 0.01 to 0.5 mm in one or more direction(s) along the surface.

Embodiments of the surface coating layer of the electroconductive material for a connection component according to the present invention may include preferred embodiments described hereinafter like those disclosed in US 2008/0090096.

In embodiments, the surface coating layer further includes a Cu coating layer formed between the surface of the base member and the Cu—Sn alloy coating layer.

In embodiments, the surface coating layer includes a Ni coating layer formed between the surface of the base member and the Cu—Sn alloy coating layer. In embodiments, the surface coating layer further includes a Cu coating layer between the Ni coating layer and the Cu—Sn alloy coating layer.

In embodiments, the Sn coating layer, the Cu coating layer and the Ni coating layer are not only metallic Sn, Cu and Ni, respectively, but also may be a Sn alloy, a Cu alloy and a Ni alloy, respectively.

Various exemplary embodiments of the present invention improve resistance to fretting corrosion of the electroconductive material for a connection component disclosed in US 2008/0090096.

In various exemplary embodiments, an electroconductive material includes a base member comprising a sheet or strip of copper or copper alloy; a Cu—Sn alloy coating layer; and a Sn coating layer. In some such embodiments, at least a portion of the Cu—Sn alloy coating layer is between the base member and the Sn coating layer. In some such embodiments, the Cu—Sn alloy coating layer has a Cu content of 20 to 70 atomic %. In some such embodiments, the Cu—Sn alloy coating layer has an average thickness of 0.2 to 3.0 μm. In some such embodiments, the Sn coating layer has an average thickness of 0.2 to 5.0 μm. In some such embodiments, a surface of the electroconductive material has an arithmetic average roughness Ra of at least 0.15 μm in at least one direction along the surface. In some such embodiments, the surface of the electroconductive material has an arithmetic average roughness Ra of 3.0 μm or less in all directions along the surface. In some such embodiments, the Cu—Sn alloy coating layer is partially exposed at the surface of the electroconductive material. In some such embodiments, an area ratio of the Cu—Sn alloy coating layer exposed at the surface of the electroconductive material is 3 to 75%. In some such embodiments, an average crystal grain size on a surface of the Cu—Sn alloy coating layer is less than 2 μm.

In various exemplary embodiments, a connection component includes a male terminal and a female terminal. In some such embodiments, at least one of the male terminal and the female terminal includes an electroconductive material as described herein.

In various exemplary embodiments, a method of manufacturing an electroconductive material, includes roughening a surface of a base member including a sheet or strip of copper or copper alloy, applying a Cu layer to the base member, applying a Sn layer to the Cu layer, and performing a reflow treatment. In some such embodiments, the electroconductive material is heated at a rate of at least 15° C. per second during the reflow treatment. In some such embodiments, the electroconductive material is held at a temperature of 400 to 650° C. for a period of 5 to 30 seconds during the reflow treatment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
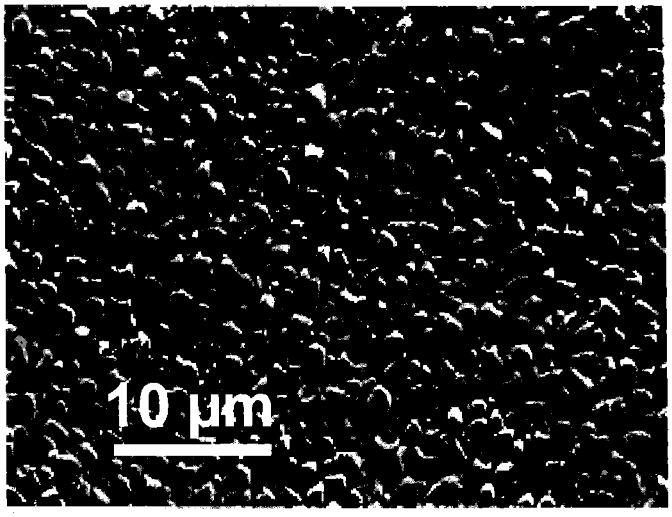
FIG. 1 is a scanning electron microscopic (SEM) image of an outermost surface structure of the Cu—Sn alloy coating layer of Example 1.

Referring now to the drawings, wherein like reference numerals designate identical or corresponding parts throughout the several views, various exemplary embodiments of the electroconductive material for a connection component according to the present invention are described.

(1) Cu Content in Cu—Sn Alloy Coating Layer

In embodiments, the content of Cu in the Cu—Sn coating layer is 20 to 70 atomic % as in the electroconductive material for a connection component disclosed in US 2008/0090096. The Cu—Sn alloy coating layer having a Cu content of 20 to 70 atomic % may be made of an intermetallic compound made mainly of a $Cu_6Sn_5$ phase. In embodiments of the present invention, the $Cu_6Sn_5$ phase partially projects from the outside surface of the Sn coating layer. Thus, when the electric contact point regions slide or slide minutely during terminal mating or separation, the hard $Cu_6Sn_5$ phase receives contacting pressure so that the contacting area between the Sn coating layers can be remarkably reduced. The wear or oxidization of the Sn coating layer is also reduced, accordingly. On the other hand, although a $Cu_3Sn$ phase is harder, the Cu content therein is larger than that in the $Cu_6Sn_5$ phase. Accordingly, when this $Cu_3Sn$ phase is partially exposed at the outside surface of the Sn coating layer, the amount of a Cu oxide and oxides of other elements is increased on the material surface, for example, with the passage of time or by corrosion. Thus, each of the terminals is easily increased in contact resistance, and does not easily keep electrical connecting reliability. Additionally, the $Cu_3Sn$ phase is more brittle than the $Cu_6Sn_5$ phase, therefore inducing poor bending workability. Accordingly, in embodiments, constituent components of the Cu—Sn alloy coating layer are regulated to set the Cu content into the range of 20 to 70 atomic %. This Cu—Sn alloy coating layer may partially contain a $Cu_3Sn$ phase, and may contain, for example, component elements of the base member and the Sn plating. However, if the Cu content in the Cu—Sn alloy coating layer is less than 20 atomic %, the adhesive force is increased and the fretting corrosion resistance of the terminal is decreased. On the other hand, if the Cu content is more than 70 atomic %, the terminal does not easily keep electrical connecting reliability based on the passage of time or corrosion. The material is also deteriorated in, for example, bending workability. Accordingly, in embodiments, the Cu content in the Cu—Sn alloy coating layer is specified into the range of 20 to 70 atomic %, more preferably 45 to 65 atomic %.

(2) Average Thickness of Cu—Sn Alloy Coating Layer

In embodiments, the average thickness of the Cu—Sn alloy coating layer is controlled to be 0.2 to 3.0 μm, which is similar to the electroconductive material for a connection component disclosed in US 2008/0090096. In embodiments of the present invention, the average thickness of the Cu—Sn alloy coating layer is defined as a value obtained by dividing the surface density (unit: $g/mm^2$) of Sn contained in the Cu—Sn alloy coating layer by the density (unit: $g/mm^3$) of Sn (a method for measuring the average thickness of a Cu—Sn alloy coating layer in accordance with this definition is described with respect to an example below). If the average thickness of the Cu—Sn alloy coating layer is less than 0.2 μm, the following disadvantage is caused: in particular, when the Cu—Sn alloy coating layer is formed to be partially exposed at the material surface as in embodiments of the present invention, the amount of a Cu oxide on the material surface is increased by thermal diffusion at high-temperature, which increases the contact resistance easily. Thus, the terminal does not easily keep electrical connecting reliability. On the other hand, if the average thickness is more than 3.0 μm, an economic disadvantage is caused. The material is poor in productivity. The thickness of the hard layer is so large that the material is deteriorated in bending workability, and others. Accordingly, in embodiments of the present invention, the average thickness of the Cu—Sn alloy coating layer is specified to 0.2 to 3.0 μm, more desirably 0.3 to 1.0 μm.

(3) Average Thickness of Sn Coating Layer

In embodiments, the average thickness of the Sn coating layer is controlled to be 0.2 to 5.0 μm, which is similar to the electroconductive material for a connection component disclosed in US 2008/0090096. If the average thickness of the Sn coating layer is less than 0.2 μm, the amount of Cu diffused into the outside surface of the Sn coating layer by thermal diffusion becomes large so that the amount of a Cu oxide in the outside surface of the Sn coating layer becomes large, thus increasing the terminal easily in contact resistance, and deteriorating the terminal in corrosion resistance. It is therefore difficult for the terminal to keep the electrical connecting reliability. On the other hand, if the average thickness is more than 5.0 μm, an economic disadvantage is caused. The material is also poor in productivity. Accordingly, in embodiments of the present invention, the average thickness of the Sn coating layer is specified to 0.2 to 5.0 μm, more desirably 0.5 to 3.0 μm.

In embodiments, if the Sn coating layer includes a Sn alloy, constituents of the alloy other than Sn are Pb, Bi, Zn, Ag, and Cu or the like. The content of Pb is desirably less than 50% by mass. The content of other elements is desirably less than 10% by mass.

(4) Arithmetic Average Roughness Ra of Material Surface

In embodiments, the arithmetic average roughness Ra of the material surface is controlled to be 0.15 μm or more in at least one direction along the surface and 3.0 μm or less in all directions along the surface, which is similar to the electroconductive material for a connection component disclosed in US 2008/0090096. If the arithmetic average roughness Ra of the material surface is less than 0.15 μm in all directions along the surface, the height of projections of the Cu—Sn alloy coating layer from the material surface is low as a whole. When the electric contact point regions slide or slide minutely, the area proportion of the exposed hard $Cu_6Sn_5$ phase, which effectively undertakes the contact force, becomes small. Suppressing the scraping the Sn layer off becomes difficult.

On the other hand, if the arithmetic average roughness Ra is more than 3.0 μm in any direction, the amount of a Cu oxide in the material surface is increased by thermal diffusion at high temperature. Thus, the terminal increases easily in contact resistance, and does not easily keep electrical connecting reliability. Accordingly, in embodiments, the surface roughness of the material surface is specified as follows: the arithmetic average roughness Ra is 0.15 μm or more in one or more direction(s) along the surface, and the arithmetic average roughness Ra is 3.0 μm or less, more desirably 0.2 to 2.0 μm in all directions along the surface.

(5) Area Ratio of Exposed Surface of Cu—Sn Alloy Coating Layer from Material Surface In embodiments, the area ratio of exposed surface of Cu—Sn alloy coating layer from material surface is controlled to be in the range from 3 to 75%, which is similar to the electroconductive material for a connection component disclosed in US 2008/0090096. In embodiments of the present invention, the area ratio of the exposed surface of the Cu—Sn alloy coating layer to the material surface (specifically, the surface of the Sn coating layer) is calculated as a value obtained by multiplying the exposed surface area of the Cu—Sn alloy coating layer per unit surface area of the material by 100. If the area ratio of the exposed surface of the Cu—Sn alloy coating layer to the material surface is less than 3%, in the mating or separation of the terminals, the quantity of adhesion between their Sn coating layers increases and further the contacting area therebetween increases to make it difficult to lower frictional coefficient of the terminals. Thus, the amount of wear by fretting corrosion increases in the Sn coating layer. On the other hand, if the area ratio of the exposed surface to the material surface is more than 75%, the amount of a Cu oxide and oxides of other elements is increased on the material surface, for example, with the passage of time or by corrosion. Thus, each of the terminals is easily increased in contact resistance, and does not easily keep electrical connecting reliability. Accordingly, in embodiments, the area ratio of the exposed surface of the Cu—Sn alloy coating layer to the material surface is specified to 3 to 75%, more desirably 10 to 50%.

(6) Average Size of Crystal Grains of the Surface of Cu—Sn Alloy Coating Layer

In embodiments, the average size of crystal grains of the surface of Cu—Sn alloy coating layer is controlled to be less than 2 μm. A small average size of crystal grains leads a higher surface hardness of the Cu—Sn alloy coating layer, resulting in improved resistance to fretting wear. Thus, in embodiments, the average size of crystal grains of the surface of Cu—Sn alloy coating layer is controlled to be less than 2 μm, desirably to 1.5 μm or less, more desirably 1.0 μm or less. As shown in the examples below, an average size of crystal grains of the surface of the Cu—Sn alloy coating layer exceeds 2 μm in the surface coating layer of the electroconductive material for a connection component obtained under preferred conditions for reflow treatment according to US 2008/0090096.

(7) Average Material Surface Exposed Region Interval of Cu—Sn Alloy Coating Layer In embodiments, the average material surface exposed region interval of the Cu—Sn alloy coating layer in at least one direction of the surface is desirably controlled to 0.01 to 0.5 mm, which is similar to the electroconductive material for a connection component disclosed in US 2008/0090096. In embodiments of the present invention, the average material surface exposed region interval of the Cu—Sn alloy coating layer is defined as a value obtained by adding the average of the respective width of the regions of the Cu—Sn alloy coating layer which traverse a straight line drawn on the surface of the material, namely the surface of the Sn coating layer (the respective length along the straight line), to the average of respective widths of the regions of the Sn coating layer which traverse the straight line.

If the average material surface exposed region interval of the Cu—Sn alloy coating layer is less than 0.01 mm, the amount of a Cu oxide is increased on the material surface by thermal diffusion at high temperature. Thus, the terminal increases easily in contact resistance, and does not easily keep electrical connecting reliability. On the other hand, if the average material surface exposed region interval is more than 0.5 mm, the material used, in particular, in a small sized terminal may make it difficult to obtain a low frictional coefficient. In general, as terminals become smaller, the contact area between their electric contact point regions (mated or separated regions), such as indentations or ribs, becomes smaller. Thus, in the mating or separation thereof, the probability of the contact between the Sn coating layers is increased. This increases adhesion so that the terminals do not easily obtain a low frictional coefficient. Accordingly, in embodiments, the average material surface exposed region interval of the Cu—Sn alloy coating layer is desirably set to 0.01 to 0.5 mm in one or more direction(s) (particularly, the direction perpendicular to the rolled direction). More desirably, the average material surface exposed region interval of the Cu—Sn alloy coating layer is set to 0.01 to 0.5 mm in all the directions. This decreases the probability that in the mating or separation of the terminals, only the Sn coating layers contact each other. Even more desirably, the interval is set to 0.05 to 0.3 mm in all directions.

(8) Thickness of Regions of Cu—Sn Alloy Coating Layer Exposed at Outside Surface of Sn Coating Layer The thickness of the Cu—Sn alloy coating layer exposed to the surface in the electroconductive material for a connection component according to embodiments of the present invention is desirably 0.2 μm or more, which is similar to the electroconductive material for a connection component disclosed in US 2008/0090096. When the Cu—Sn alloy coating layer is partially exposed at the outside surface of the Sn coating layer as in embodiments of the present invention, the thickness of regions of the Cu—Sn alloy coating layer that are exposed at the outside surface of the Sn coating layer may be far smaller than the average thickness of the Cu—Sn alloy coating layer depending on the conditions of production.

In embodiments of the present invention, the thickness of the regions of the Cu—Sn alloy coating layer exposed at the outside surface of the Sn coating layer is defined as a value measured through observation of a cross section of the layer (this measuring method is different from the method for measuring the average thickness of the Cu—Sn alloy coating layer). If the thickness of regions of the Cu—Sn alloy coating layer that are exposed at the outside surface of the Sn coating layer is less than 0.2 μm, the amount of a Cu oxide is increased on the material surface by thermal diffusion at high temperature and, further, the material deteriorates in corrosion resistance, particularly when the Cu—Sn alloy coating layer is formed to be partially exposed at the material surface as in embodiments of the present invention. Thus, the terminal easily increases in contact resistance, and does not easily keep electrical connecting reliability. Accordingly, in embodiments, the thickness of regions of the Cu—Sn alloy coating layer that are exposed at the outside surface of the Sn coating layer is desirably set to 0.2 μm or more, more desirably 0.3 μm or more.

(9) Structure of the Surface Coating Layer

In embodiments in which, as the base member, a Zn-containing Cu alloy such as brass or red brass is used, or in other embodiments, the electroconductive material may have a Cu coating layer between the base member and the Cu—Sn alloy coating layer, as in the electroconductive material for a connection component described in US 2008/0090096. This Cu coating layer includes a Cu plating layer which remains after carrying out reflow treatment. It is widely known that the Cu coating layer functions to restrain the diffusion of Zn and other base member constituent elements to the material surface, thus improving the material in solderability and other properties. If the Cu coating layer is too thick, the material deteriorates in bending workability and also in economic efficiency. Thus, the thickness of the Cu coating layer is preferably 3.0 μm or less.

In embodiments, a small amount of component elements contained in the base member and other elements may be incorporated in the Cu coating layer. When the Cu coating layer is made of a Cu alloy, examples of a constituent component other than Cu in the Cu alloy include Sn and Zn. Desirably, the content of Sn is less than 50% by mass, and that of other elements is less than 5% by mass.

Like the electroconductive material for a connection component described in US 2008/0090096, exemplary electroconductive materials for connection components according to the present invention may have a Ni coating layer between the base member and the Cu—Sn alloy coating layer (in embodiments not including a Cu coating layer), or between the base member and the Cu coating layer. It is known that the Ni coating layer inhibits the diffusion of Cu and other base member constituent elements to the material surface to prevent increased contact resistance the in the terminal even after long-term use at high temperature, inhibits the growth of the Cu—Sn alloy coating layer to prevent consumption of the Sn coating layer, and further improves the material in sulfurous acid gas corrosion resistance. The diffusion of the Ni coating layer itself to the material surface is prevented by the Cu—Sn alloy coating layer or the Cu coating layer. For this reason, a material for a connection component in which the Ni coating layer is formed is particularly suitable for a connection component for which heat resistance is required. If the Ni coating layer becomes too thick, the material deteriorates in bending workability and other properties, and also in economic efficiency. Thus, the thickness of the Ni coating layer is preferably 3.0 μm or less.

In embodiments, a small amount of component elements contained in the base member and/or other elements may be incorporated in the Ni coating layer. When the Ni coating layer is made of a Ni alloy, examples of a constituent components other than Ni in the Ni alloy include Cu, P, and Co. The content of Cu is desirably 40% or less by mass, and that of P or Co is desirably 10% or less by mass. A Co or Co alloy coating layer or a Fe or Fe alloy coating layer may be used instead of the Ni coating layer.

(10) Method for Producing the Electroconductive Material for a Connection Component In embodiments, the electroconductive material for a connection component according to the present invention is produced as described below. Exemplary methods are the same or similar to a manufacturing method for the electroconductive material for a connection component described in US 2008/0090096. First, a surface of a base member made of a copper alloy sheet or strip is roughened. Then, a Sn plating layer is formed directly on the roughened surface of the base member. Alternatively, a Ni or Cu plating layer and a Sn plating layer are formed in this order over the roughened surface of the base member. Thereafter the workpiece is subjected to a reflow treatment.

There are several methods to roughen the base member surface, including physical methods such as ion etching, chemical methods such as chemical etching and electrolytic grinding, and mechanical methods such as rolling (using a working roll having a surface roughened by polishing and shot blast or the like), polishing, and shot blast. Among these methods, rolling and polishing are desirable in terms of productivity, economic efficiency, and reproducibility of the morphology of the base member surface.

If the Ni plating layer, the Cu plating layer, and Sn plating layer include a Ni alloy, a Cu alloy, and a Sn alloy, respectively, alloys describe above for the Ni coating layer, the Cu coating layer, and the Sn coating layer may be used.

The average thickness of the Ni plating layer is desirably adjusted to 3 μm or less. The average thickness of the Cu plating layer is desirably adjusted to 0.1 to 1.5 μm. The average thickness of the Sn plating layer is desirably adjusted to 0.4 to 8.0 μm. In embodiments, the Cu plating layer is not formed at all when the Ni plating layer is not formed.

In embodiments, as a result of reflow treatment, a Cu—Sn alloy coating layer is formed by interdiffusion of Cu from the Cu plating layer or the Cu alloy base member and Sn from the Sn plating layer. In embodiments, the Cu plating layer completely disappears and, in other embodiments, the Cu plating layer partially remains.

The surface roughness of the roughened surface of the base member is desirably controlled to obtain an arithmetic average roughness Ra to 0.3 μm or more in one or more direction(s) and to obtain an arithmetic average roughness Ra to 4.0 μm or less in all directions, as in the electroconductive material for a connection component described in the US 2008/0090096. If the arithmetic average roughness Ra of the roughened surface of the base member is less than 0.3 μm in all directions along the base member surface, it is very difficult to produce the electroconductive material for a connection component of the present invention. Specifically, it is very difficult to set the arithmetic average roughness Ra of the material surface after the reflow treatment to 0.15 μm or more in one or more direction(s), while setting the area ratio of the exposed surface of the Cu—Sn alloy coating layer to the material surface to 3 to 75% and setting the average thickness of the Sn coating layer to 0.2 to 5.0 μm. On the other hand, if the arithmetic average roughness Ra is more than 4.0 μm in any direction, it is difficult to smooth the outside surface of the Sn coating layer by a flowing effect of Sn or the Sn alloy in a melted state. Accordingly, in embodiments, the surface roughness of the base member is adjusted to set the arithmetic average roughness Ra to 0.3 μm or more in one or more direction(s) and set the arithmetic average roughness Ra to 4.0 μm or less in all directions. This surface roughness produces a flowing effect of the melted Sn or Sn alloy (the smoothing of the Sn coating layer); following this effect, the Cu—Sn alloy coating layer that has been grown by the reflow treatment is partially exposed at the material surface.

It is also desired that the material surface after reflow treatment has an average material surface exposed region interval of 0.01 to 0.5 mm in one direction, like the electroconductive material for a connection component described in US 2008/0090096. The Cu—Sn alloy coating layer formed between the Cu alloy base member or the Cu plating layer, and the Sn plating in a melted state usually grows while reflecting the surface state of the base member. Thus, the material surface exposed region interval of the Cu—Sn alloy coating layer roughly reflects the average interval Sm between asperities in the base member surface. Accordingly, the average interval Sm between the asperities, which is measured in one direction, is desirably 0.01 to 0.5 mm, more desirably 0.05 to 0.3 mm. This makes it possible to control the exposure form of the regions of the Cu—Sn alloy coating layer exposed at the material surface.

According to US 2008/0090096, the reflow treatment is desirably conducted at temperatures of 600° C. or less for 3 to 30 seconds. More desirable conditions are at temperatures of 300° C. or less, applying the minimal amount of heat necessary to conduct the reflow treatment. In the examples of US 2008/0090096, the reflow treatment is mainly conducted at 280° C. for 10 seconds. The crystal grain size of the Cu—Sn alloy coating layer ranges from a few to several tens of μm after the reflow treatment as described in Table 2 of US 2008/0090096.

The present inventors, on the other hand, discovered that it is necessary to increase the heating rate in the reflow treatment to further decrease the crystal grain size to less than 2 μm in the Cu—Sn alloy coating layer. To increase the heating rate, the amount of heat input to the material in the reflow treatment should be increased by setting the temperature of the furnace higher for the reflow treatment. The heating rate is desirably 15° C./second or more, and more desirably 20° C./second or more. It appears that a heating rate of from approximately 8 to 12° C./second or less is used in the reflow treatment described in US 2008/0090096, as the crystal grain size of the Cu—Sn alloy coating layer is described as ranging from a few to several tens of μm.

The lower limit of the actual reflow temperature is desirably 400° C. or higher, and more desirably 450° C. or higher. On the other hand, the upper limit of reflow temperature is desirably 650° C. or lower, and more desirably 600° C. or lower in order to avoid excessive content of Cu in the Cu—Sn alloy coating layer. Further, the duration to hold the workpiece at the reflow temperature (reflow treatment time) is desirably controlled to approximately 5 to 30 seconds. As the reflow treatment temperature is high, the reflow treatment time is desirably short. In embodiments, after the reflow treatment, the workpiece is quenched by being immersed in water by an ordinary procedure. A Cu—Sn alloy coating layer with small crystal grains may be formed by the reflow treatment described above. Further, a Cu—Sn alloy coating layer with Cu content of 20 to 70% and of 0.2 μm or more in thickness of regions exposed at the material surface may be formed. Excessive wear of the Sn plating layer is thus suppressed.

EXAMPLES

Copper alloy base members of various surface roughnesses were prepared. For the copper alloy base members of Examples 1 to 7, surface roughening treatment was carried out by mechanical methods (rolling or polishing). For Examples 8 to 10, surface roughening treatment was not conducted. The base members include Ni: 0.8% by mass, Sn: 1.2% by mass, P: 0.07% by mass, the balance being Cu. The base members have following properties: tensile strength of 590 MPa, elongation of 12%, hardness Hv of 185, and electrical conductivity of 40% IACS. The copper base members, except for Examples 5, 6, and 10, were plated with Ni. Subsequently, Cu and Sn were plated at various thicknesses on all of the copper base members. By controlling the temperature of the reflow treatment furnace, reflow treatments of various combinations of temperature and duration shown in Table 1 were conducted. The heating rate to the reflow temperature was 15° C./second or more for Examples 1 to 6, while the heating rate was about 10° C./second for Examples 7 to 10.

TABLE 1

| Example | Average thickness of coating layer (μm) | | |
|---|---|---|---|
| | Ni | Cu—Sn | Sn |
| 1 | 0.3 | 0.4 | 0.5 |
| 2 | 0.3 | 0.6 | 0.3 |
| 3 | 0.3 | 0.3 | 0.7 |
| 4 | 0.3 | 0.8 | 1.5 |
| 5 | — | 0.4 | 0.4 |
| 6 | — | 0.3 | 0.8 |
| 7 | 0.3 | 0.4 | 0.70 |
| 8 | 0.3 | 0.4 | 0.5 |
| 9 | 0.3 | 0.5 | 2.0 |
| 10 | — | 0.4 | 0.7 |

| Cu—Sn alloy coating layer | | | |
|---|---|---|---|
| Ratio of | Thickness | Surface exposed | Average |

TABLE 1-continued

| Example | Cu content (%) | exposed to the surface (%) | of exposed region (μm) | region interval (mm) | crystal grain size (μm) |
|---|---|---|---|---|---|
| 1 | 55 | 40 | 0.50 | 0.11 | 0.6 |
| 2 | 65 | 60 | 0.60 | 0.13 | 0.7 |
| 3 | 45 | 20 | 0.35 | 0.16 | 0.4 |
| 4 | 60 | 30 | 0.85 | 0.15 | 1.9 |
| 5 | 55 | 35 | 0.55 | 0.13 | 0.5 |
| 6 | 45 | 10 | 0.40 | 0.20 | 0.5 |
| 7 | 55 | 30 | 0.45 | 0.15 | 2.3 * |
| 8 | 55 | 0 * | — | — | 2.5 * |
| 9 | 55 | 0 * | — | — | 2.8 * |
| 10 | 55 | 0 * | — | — | 2.6 * |

| Example | Surface roughness Ra of coating layer (μm) | Reflow treatment | Fretting wear depth (μm) |
|---|---|---|---|
| 1 | 0.52 | at 450° C. for 15 sec | 0.6 |
| 2 | 0.93 | at 450° C. for 20 sec | 0.4 |
| 3 | 0.28 | at 600° C. for 8 sec | 0.8 |
| 4 | 0.18 | at 400° C. for 30 sec | 1.2 |
| 5 | 0.30 | at 550° C. for 12 sec | 0.5 |
| 6 | 0.20 | at 500° C. for 10 sec | 0.7 |
| 7 | 0.35 | at 280° C. for 10 sec | 1.4 |
| 8 | 0.06 * | at 280° C. for 10 sec | 1.5 |
| 9 | 0.04 * | at 280° C. for 10 sec | 3.0 |
| 10 | 0.05 * | at 280° C. for 10 sec | 1.7 |

According to the methods described below, the materials of the respective examples were evaluated and the results are shown in Table 1. The following were measured: the content of Cu in the Cu—Sn alloy coating layer, the average thickness of the Ni coating layer, the average thickness of the Cu—Sn alloy coating layer, the average thickness of the Sn coating layer, the arithmetic average roughness Ra of material surface, the area ratio of exposed surface of the Cu—Sn alloy coating layer from the material surface, the thickness of regions of the Cu—Sn alloy coating layer exposed at the material surface, and the average material surface exposed region interval of the Cu—Sn alloy coating layer. The Cu plating layer disappeared from the materials of Examples 1 to 10.

The methods of measurements described below correspond to those described in US 2008/0090096 except for the method of measuring average size of crystal grains of the surface of Cu—Sn alloy coating layer.

[Measurement of Average Thickness of Ni Plating]

A fluorescent X-ray film thickness meter (SFT3200, manufactured by Seiko Instruments Ltd.) was used to calculate the average thickness of the Ni plating of the material of each of the examples before the reflow treatment. The measuring conditions were as follows: a calibration curve used was a 2-layer calibration curve of a Sn/Ni/base member, and the collimator diameter was set to 0.5 mm.

[Measurement of Cu Content in Cu—Sn Alloy Coating Layer]

The material of each of the examples was first immersed in an aqueous solution containing p-nitrophenol and sodium hydroxide as components for 10 minutes to remove the Sn layer. Thereafter, an EDX (energy dispersive X-ray spectrometer) was used to analyze the Cu content in the Cu—Sn alloy coating layer quantitatively.

[Measurement of Average Thickness of Cu—Sn Alloy Coating Layer]

The material of each of the Examples was first immersed in an aqueous solution containing p-nitrophenol and sodium hydroxide as components for 10 minutes to remove the Sn layer. Thereafter, a fluorescent X-ray film thickness meter (SFT3200, manufactured by Seiko Instruments Ltd.) was used to measure the film thickness of the Sn component contained in the Cu—Sn alloy coating layer. The measuring conditions were as follows: a calibration curve used was a single-layer calibration curve of a Sn/base member, or a 2-layer calibration curve of a Sn/Ni/base member, and the collimator diameter was set to 0.5 mm. The resultant value was defined as the average thickness of the Cu—Sn alloy coating layer.

[Measurement of Average Thickness of Sn Coating Layer]

A fluorescent X-ray film thickness meter (SFT3200, manufactured by Seiko Instruments Ltd.) was first used to measure the sum of the film thickness of the Sn coating layer of the material of each of the examples and that of the Sn component contained in the Cu—Sn alloy coating layer. Thereafter, each material was immersed in an aqueous solution containing p-nitrophenol and sodium hydroxide as components for 10 minutes to remove the Sn layer. The fluorescent X-ray film thickness meter was again used to measure the film thickness of the Sn component contained in the Cu—Sn alloy coating layer. The measuring conditions were as follows: a calibration curve used was a single-layer calibration curve of a Sn/base member, or a 2-layer calibration curve of a Sn/Ni/base member, and the collimator diameter was set to 0.5 mm. The average thickness of the Sn coating layer was calculated out by subtracting the film thickness of the Sn component contained in the Cu—Sn alloy coating layer from the resultant sum of the film thickness of the Sn coating layer and that of the Sn component contained in the Cu—Sn alloy coating layer.

[Measurement of Surface Roughness of Material]

A contact-type surface roughness meter (SURFCOM 1400, manufactured by Tokyo Seimitsu Co., Ltd.) was used to measure the roughness on the basis of JIS B0601-1994. Conditions for the surface roughness measurement were as follows: the cutoff value was set to 0.8 mm; the standard length was 0.8 mm; the evaluating length was 4.0 mm; the measuring rate was 0.3 mm/s; and the radius of the probe tip was 5 μmR. The direction in which the surface roughness was measured was rendered a direction perpendicular to the rolled or polished direction (i.e., a direction in which the largest surface roughness was to be exhibited).

[Area Ratio of Exposed Surface of Cu—Sn Alloy Coating Layer to Material Surface]

An SEM (scanning electron microscope), on which an EDX (energy dispersive X-ray spectrometer) was mounted, was used to observe the surface of the material of each of the examples at 200 magnifications. From a difference in the brightness of the resultant composition image (from which a difference according to contrasts based on stains, scratches and the like was removed), the area ratio of the exposed surface of the Cu—Sn alloy coating layer to the material surface was measured by image analysis.

[Average Material Surface Exposed Region Interval of Cu—Sn Alloy Coating Layer]

An SEM (scanning electron microscope), on which an EDX (energy dispersive X-ray spectrometer) was mounted, was used to observe the surface of each of the material of each of the examples at 200 magnifications. From the resultant composition image, an average was calculated as a value obtained by adding the average of the respective widths of the Cu—Sn alloy coating layer regions traversing a straight line drawn on the material surface and along the direction perpendicular to the rolled direction (the widths: the respective lengths along the line) to that of the respective widths of the Sn coating layer regions traversing the line. In this way, the average material surface exposed region interval of the Cu—Sn alloy coating layer was measured.

[Measurement of Thickness of Regions of Cu—Sn Alloy Coating Layer Exposed at Material Surface]

A cross section of the material of each of the examples processed by a microtome method was observed through an SEM (scanning electron microscope) at 10,000 magnifications. The cross section image was subjected to image processing to calculate out the average thickness of the Cu—Sn alloy coating layer regions exposed at the material surface.

[Measurement of Average Crystal Grain Size at the Surface of Cu—Sn Alloy Coating Layer]

The material of each of the examples was immersed in an aqueous solution containing p-nitrophenol and sodium hydroxide as components for 10 minutes. The surface of the material was then observed through an SEM (scanning electron microscope) at 3,000 magnifications. By image analyses, a mean of diameters of circles assuming each observed crystal grain a circle (circle equivalent diameters) was calculated to determine the average crystal grain size at the surface of Cu—Sn alloy coating layer. An image of an outermost surface structure of the material of Example 1 is shown in FIG. 1.

Resistance to fretting corrosion was evaluated by the following procedure. The measured amount of fretting corrosion for each material is shown in Table 1.

[Test for Evaluating Resistance to Fretting Wear]

Figure 2:
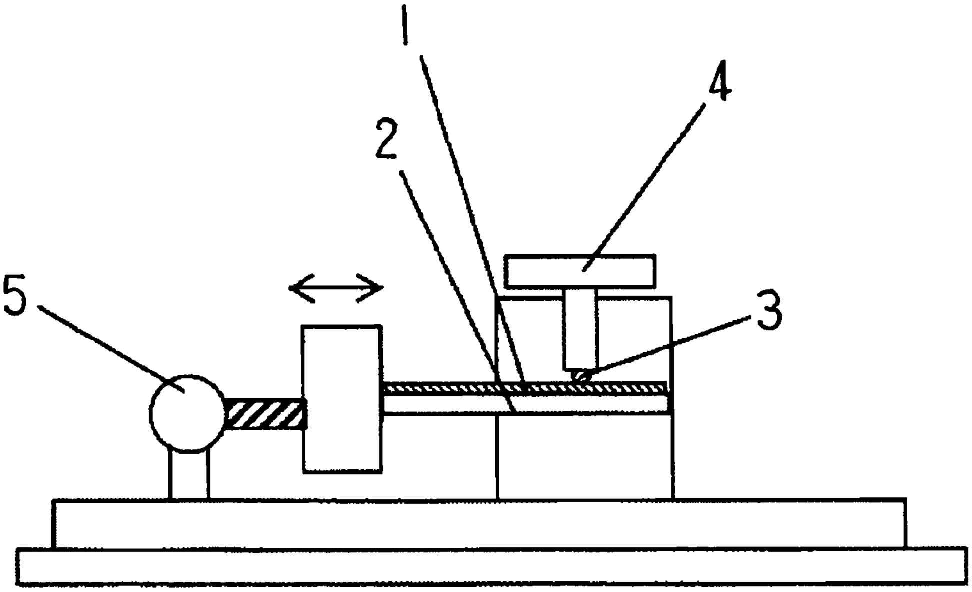
FIG. 2 is a schematic depiction of equipment that may be used to measure fretting corrosion.

The shape of an indented region of electrical contact points of mating connectors was imitated, and the fretting wear was evaluated, using a sliding test machine (CRS-B1050CHO, manufactured by Yamasaki-Seiki Co., Ltd.) as illustrated in FIG. 2. First, a plate-form male test piece 1 cut from the material of each of the examples was fixed onto a horizontal stand 2. A female test piece 3 was put thereon, the piece 3 being a member cut from the material of each of the examples and processed into a semi-spherical form (inside diameter: 1.5 mm), in the state of bringing the coating layers into contact with each other. Subsequently, a load of 3.0 N (weight 4) was applied to the female test piece 3 to push the male test piece 1. Using a stepping motor 5, the male test piece 1 was slid in a horizontal direction (sliding distance: 50 μm, and the sliding frequency: 1 Hz). The sliding direction of the test piece 1 was rendered.

A cross section of the material of Example 1 processed by a microtome method after sliding 100 times was observed through an SEM (scanning electron microscope) at 10,000 magnifications. The maximum depth of wear tracks observed in the cross section image was determined to be the depth of fretting corrosion. In various exemplary embodiments, electroconductive materials according to the present invention exhibit a fretting wear depth of from 0.3 to 1.5 μm, when fretting corrosion is evaluated as described above. In further exemplary embodiments, electroconductive materials according to the present invention exhibit a fretting wear depth of from 0.3 to 1.0 μm, when fretting corrosion is evaluated as described above.

As shown in Table 1, the materials of Examples 1 to 7 have features as described with respect to embodiments of the present invention, including the content of Cu in the Cu—Sn alloy coating layer, the average thickness of the Ni coating layer, the average thickness of the Cu—Sn alloy coating layer, the average thickness of the Sn coating layer, the arithmetic average roughness Ra of material surface, the area ratio of exposed surface of the Cu—Sn alloy coating layer from the material surface, the thickness of regions of the Cu—Sn alloy coating layer exposed at the material surface, and the average material surface exposed region interval of the Cu—Sn alloy coating layer. The crystal grain size of the Cu—Sn alloy coating layer was 2.3 μm for the material of Example 7, which was prepared using a low reflow treatment temperature and a low heating rate. On the other hand, the crystal grain size of the Cu—Sn alloy coating layer was less than 2.0 μm for the materials of Examples 1 to 6 for which the reflow treatment temperature and the heating rate were high. The amount of wear in the materials of each of Examples 1 to 6 was less than that in the material of Example 7. Particularly, comparing the materials of Example 3 and Example 7, in which the respective coating layer structures were similar except for the crystal grain size of the Cu—Sn alloy coating layer, the amount of wear in the material of Example 3 was 57% less than that of the material of Example 7.

It is noted that the amount of wear by fretting corrosion in the material of Example 7 was smaller compared to those in the materials of Examples 8-10, in which the area ratio of exposed surface of the Cu—Sn alloy coating layer at the material surface was equal to zero, i.e., the Cu—Sn alloy coating layer was not exposed to the outside material surface.

Obviously, numerous modifications and variations of the present invention are possible in light of the above teachings. It is therefore to be understood that within the scope of the appended claims, the invention may be practiced otherwise than as specifically described herein.

The invention claimed is:

1. An electroconductive material, comprising:

a base member comprising a sheet or strip of copper or copper alloy;

a Cu—Sn alloy coating layer; and a Sn coating layer;

wherein:

at least a portion of the Cu—Sn alloy coating layer is between the base member and the Sn coating layer;

the Cu—Sn alloy coating layer has a Cu content of 20 to 70 atomic %:

the Cu—Sn alloy coating layer has an average thickness of 0.2 to 3.0 μm;

the Sn coating layer has an average thickness of 0.2 to 5.0 μm;

a surface of the electroconductive material has an arithmetic average roughness Ra of at least 0.15 μm in at least one direction along the surface;

the surface of the electroconductive material has an arithmetic average roughness Ra of 3.0 μm or less in all directions along the surface;

the Cu—Sn alloy coating layer is partially exposed at the surface of the electroconductive material;

an area ratio of the Cu—Sn alloy coating layer exposed at the surface of the electroconductive material is 3 to 75%; and an average crystal grain size on a surface of the Cu—Sn alloy coating layer is more than 0.51 μm and less than 1 μm.

2. The electroconductive material of claim 1, further comprising a Cu coating layer between the base member and the Cu—Sn alloy coating layer.

3. The electroconductive material of claim 1, further comprising a Ni coating layer between the base member and the Cu—Sn alloy coating layer.

4. The electroconductive material of claim 3, further comprising a Cu coating layer between the Ni coating layer and the Cu—Sn alloy coating layer.

5. The electroconductive material of claim 1, wherein a surface of the base member comprises asperities distributed at an average interval of 0.01 to 0.5 mm in at least one direction along the surface.

6. The electroconductive material of claim 5, further comprising a Cu coating layer between the base member and the Cu—Sn alloy coating layer.

7. The electroconductive material of claim 5, further comprising a Ni coating layer between the base member and the Cu—Sn alloy coating layer.

8. The electroconductive material of claim 7, further comprising a Cu coating layer between the Ni coating layer and the Cu—Sn alloy coating layer.

9. The electroconductive material of claim 1, wherein a thickness of the regions of the Cu—Sn alloy coating layer exposed at the surface of the electroconductive material is at least 0.2 μm.

10. The electroconductive material of claim 9, further comprising a Cu coating layer between the base member and the Cu—Sn alloy coating layer.

11. The electroconductive material of claim 9, further comprising a Ni coating layer between the base member and the Cu—Sn alloy coating layer.

12. The electroconductive material of claim 11, further comprising a Cu coating layer between the Ni coating layer and the Cu—Sn alloy coating layer.

13. The electroconductive material of claim 1, wherein:

the electroconductive material is manufactured by a method comprising subjecting a workpiece to a reflow treatment;

the workpiece is heated at a rate of at least 15° C. per second during the reflow treatment; and the workpiece is held at a temperature of 400 to 650° C. for a period of 5 to 30 seconds during the reflow treatment.

14. A connection component, comprising:

a male terminal; and a female terminal;

wherein at least one of the male terminal and the female terminal comprises the electroconductive material of claim 1.

15. A method of manufacturing the electroconductive material of claim 1, comprising:

preparing a workpiece by:

roughening a surface of a base member comprising a sheet or strip of copper or copper alloy;

applying a Cu layer to the base member; and applying a Sn layer to the Cu layer; and subjecting the workpiece to a reflow treatment;

wherein:

the workpiece is heated at a rate of at least 15° C. per second during the reflow treatment; and the workpiece is held at a temperature of 400 to 650° C. for a period of 5 to 30 seconds during the reflow treatment.

16. The method of claim 15, wherein:

the base member is roughened so that a surface of the base member has an arithmetic average roughness Ra to 0.3 μm or more in one or more directions; and the base member is roughened so that a surface of the base member has an arithmetic average roughness Ra to 4.0 μm or less in all directions.

17. The method of claim 15, wherein:

the Cu layer is formed by plating; and the Cu layer is formed to have an average thickness of 0.1 to 1.5 μm.

18. The method of claim 15, wherein:

the Sn layer is formed by plating; and the Sn layer is formed to have an average thickness of 0.4 to 8.0 μm.

19. The method of claim 15, further comprising applying a Ni layer to the base member before applying the Cu layer.

20. The method of claim 19, wherein:

the Ni layer is formed by plating; and the Ni layer is formed to have an average thickness of 3 μm or less.

21. The method of claim 15, wherein the workpiece is heated at a rate of at least 20° C. per second during the reflow treatment.

22. The method of claim 15, wherein the workpiece is held at a temperature of 450 to 600° C. for a period of 5 to 30 seconds during the reflow treatment.

* * * * *